Oct. 25, 1966 N. W. CAREY ETAL 3,280,958
ACCUMULATOR CONVEYOR
Filed Sept. 13, 1965 3 Sheets-Sheet 1
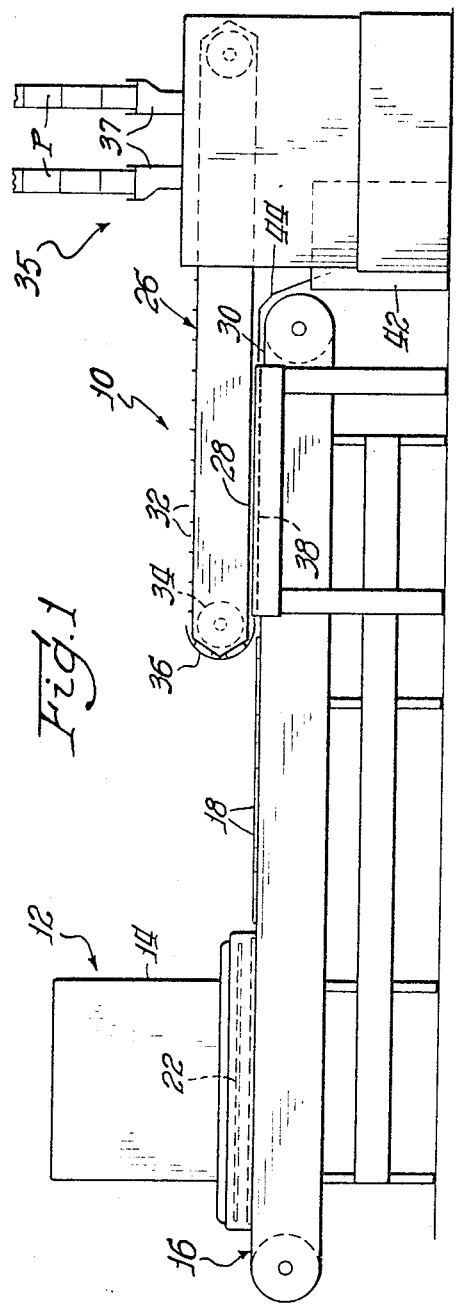
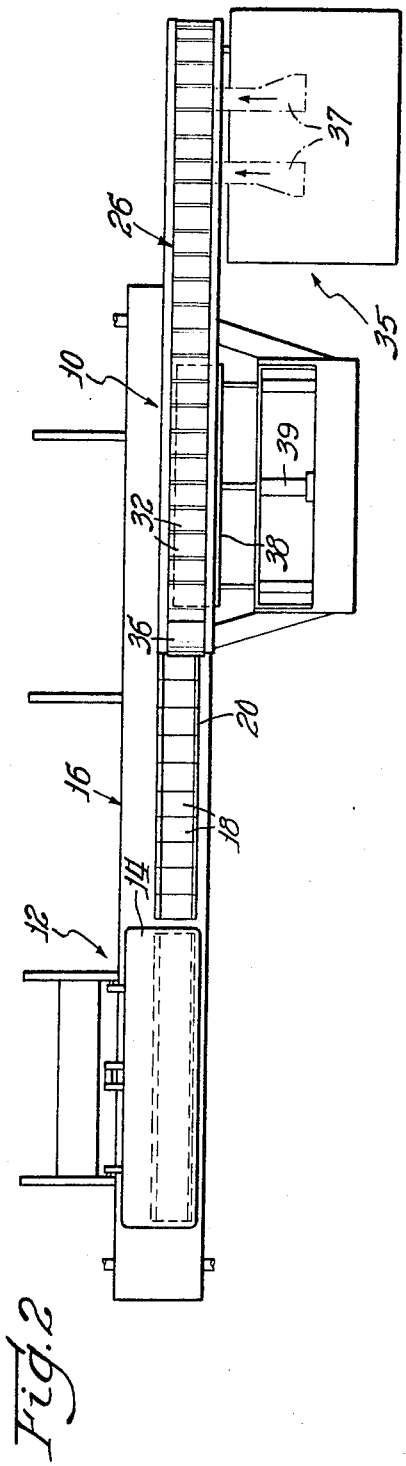
Inventors:
Norman W. Carey and
William K. Griffin, Jr.
By: Richard W. Carpenter

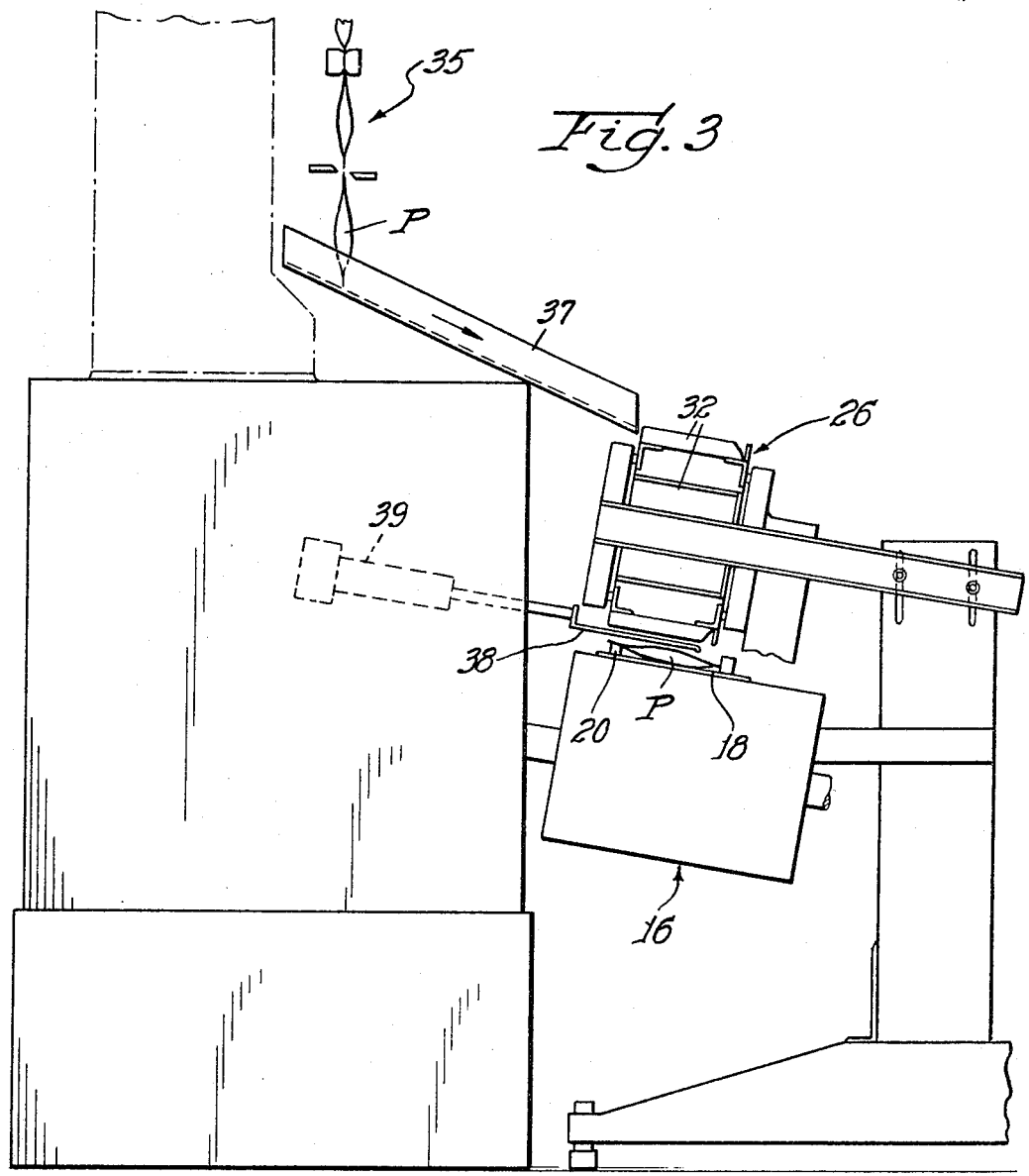
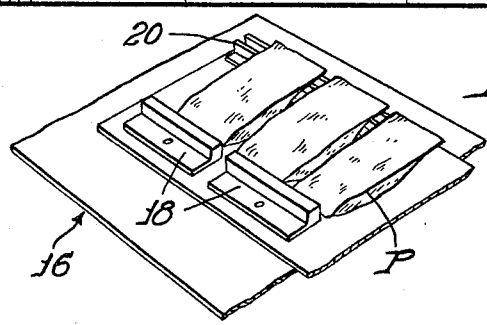

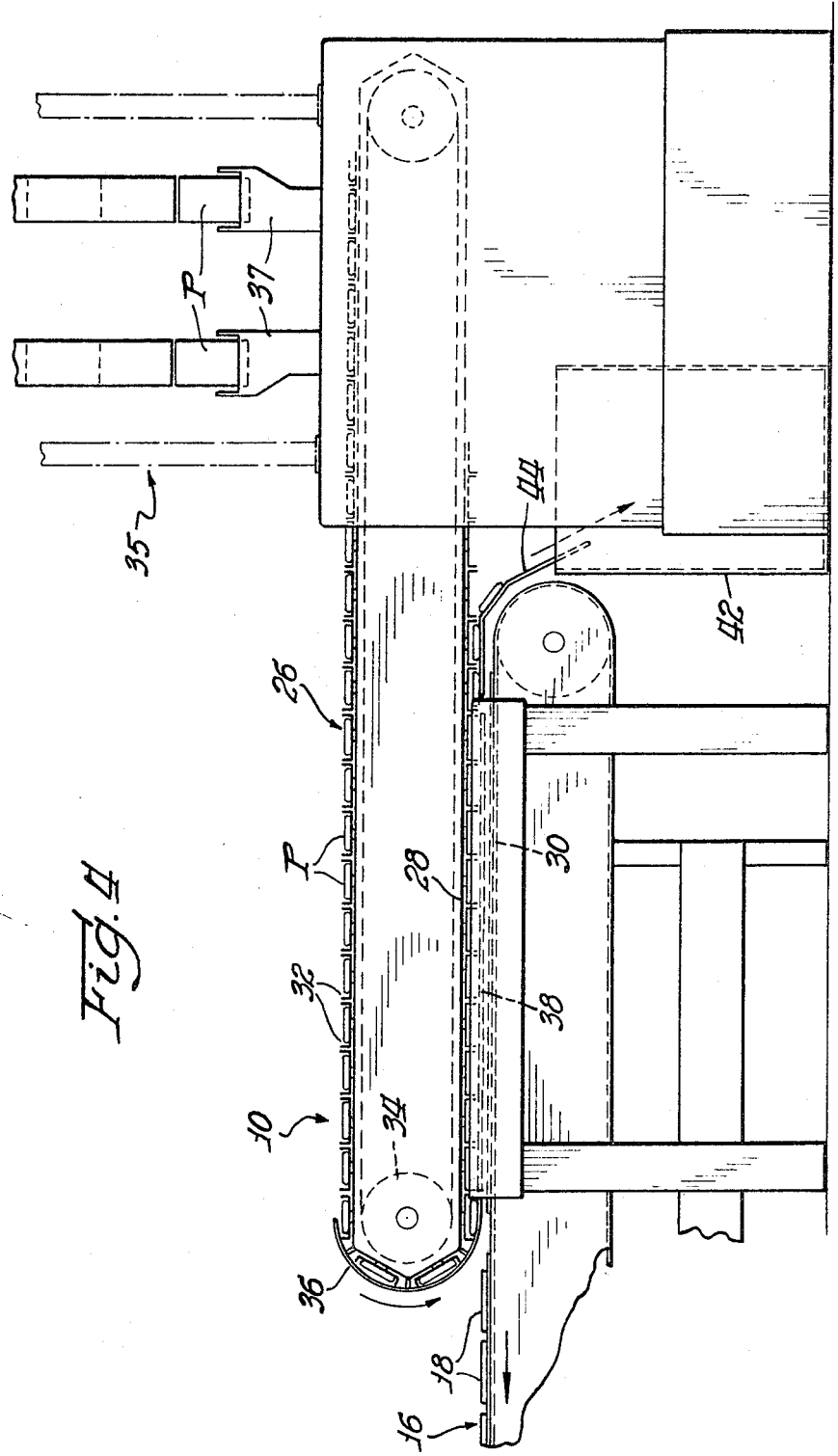

3,280,958
ACCUMULATOR CONVEYOR
Norman W. Carey, Chicago, Ill., and William K. Griffin, Jr., Philadelphia, Pa., assignors to Container Corporation of America, Chicago, Ill., a corporation of Delaware
Filed Sept. 13, 1965, Ser. No. 486,745
6 Claims. (Cl. 198—20)

This invention relates to an accumulator conveyor suitable for receiving packages individually and accumulating them and of simultaneously feeding the group of said packages to a sealing machine of the type suitable for gas flushing or vacuumizing and sealing the packages.

Plastic film packages or pouches are frequently used for food products, such as frozen vegetables, powdered mixes, coffee, and the like. It frequently is desirable to gas flush the interior of the package with an inert gas or to vacuumize the package first before sealing the package. Machines suitable for gas flushing and sealing are disclosed in the Bartelt Patent 2,649,671, issued August 25, 1953; the Mahaffy et al. Patent 2,858,655, issued November 4, 1958; and the Randall Patent 3,059,389, issued October 23, 1962. Typically, these machines include an enlarged chamber suitable for simultaneously gas flushing and sealing a predetermined group of packages at one time.

This invention relates to means for accumulating or collecting packages until the predetermined group of packages for the sealing machine is accumulated operable thereby to feed the group to the sealing machine simultaneously.

Accordingly, an object of this invention is to provide a conveyor suitable for receiving packages individually and for accumulating them as a group, and for subsequently simultaneously depositing the group on to the sealing machine.

Another object of this invention is to provide an accumulator conveyor suitable to receive an open-top plastic film package and to flip the package over while delivering the same to the sealing machine.

Another object of this invention is to provide an accumulator conveyor having a retractable blade that supports predetermined groups of plastic packages, and which can be retracted to drop all of the packages simultaneously onto a sealing machine.

These and other objectives will be more fully understood and appreciated after reviewing the following specification, including as a part thereof the accompanying drawings, wherein:

FIG. 1 is a side elevational view of the subject conveyor shown in operative association with a typical vacuum sealing machine;

FIG. 2 is a top plan view of the apparatus of FIG. 1;

FIG. 3 is an enlarged end elevational view of the apparatus of FIG. 1;

FIG. 4 is an enlarged side elevational view of a portion of the apparatus of FIG. 1; and FIG. 5 is a perspective view of a portion of the apparatus of FIG. 1.

The subject accumulator conveyor 10 is shown in operative association with a typical vacuum sealing or gas flushing machine 12 of the type disclosed in the above mentioned Mahaffy et al. and Randall patents. The sealing machine 12 includes a gas tight chamber 14 for receiving the packages or pouches P to be sealed. Appropriate sealing structure is located within the chamber and typically includes a pair of opposed sealing bars effective to clamp the open top portion of each package for sealing the same. Typically, a conveyor 16 is located adjacent the chamber 14 and has formed thereon a plurality of trays 18 for holding the packages. A stationary sealing bar 20 forms the top part of the tray 18, and the package P is placed on the tray 18 with the open adjacent top walls overlapping the sealing bar 20. The conveyor frequently is inclined slightly to help prevent the product from spilling from the open top of the package. The conveyor 16 is advanced until a group of packages are disposed within the open chamber 14, and the chamber is then closed and sealed. Thereafter, the chamber can be appropriately gas flushed or evacuated, at which time, a movable sealing bar 22 within the chamber is moved against the sealing bar 20 to seal the wall portions of the package disposed therebetween. The movable sealing bar 22 is thereafter withdrawn and the chamber 14 opened, and the conveyor 16 is advanced to remove the sealed package P from the chamber.

The subject accumulator conveyor 10 is located adjacent the sealing machine 12 and includes an endless conveyor 26 having an endward portion 28 aligned vertically over and disposed parallel to a portion 30 of the sealing machine conveyor 16. The conveyor 26 has formed thereon a plurality of open-top trays 32 for confining the packages P. The trays 32 are located on the outward side of conveyor 26 and the packages P are shown as being loaded onto the trays on the upper section of the conveyor. The loading is done automatically from the package forming machine 35, the package being discharged down inclined chutes 37 onto the trays. Apparatus of this type is disclosed in the above mentioned Bartelt patent.

To prevent each package or pouch from falling from its open top tray when the tray is moved around the end sprocket 34 to the lower section of the conveyor, a guide or shield 36 is curved to contour around the end sprocket spaced outwardly from, but adjacent the trays. A pouch or package escapement device is located adjacent the conveyor 26 between the overlapped sections 28 and 30 of the conveyors to release the packages simultaneously. The escapement device includes a blade 38 which forms a support bed for the packages P positioned in the inverted trays 38. The support blade 38 is of a length to correspond to the number of adjacent trays to be emptied simultaneously, as is shown herein, spanning 10 adjacent trays. The blade 38 is withdrawn by appropriate power cylinder means 39, when desired, to discharge the packages supported thereon into the trays 18 of the sealing machine 16. The sealing machine conveyor, and the accumulator conveyor are operated intermittently in timed relationship, and the escapement blade is withdrawn when the accumulator conveyor has stopped in registory therewith and the sealing machine conveyor is ready to be loaded.

The accumulator conveyor is shown as being top-loaded automatically from a bag forming machine, as is typical in the above mentioned Bartelt Patent 2,649,671. The accumulator conveyor is intermittently operated in timed sequence so that each package discharged from the mechanism is received within a tray on the conveyor. The top loading of the conveyor flips the article over, and this flipping action is frequently desired where the bag is formed from a tube of film and has a longitudinal seam extending the length of the package. See the Maxfield Patent 2,154,521, issued April 18, 1939. In sealing the open-top of such a package, it is desirable to locate the seam on the lower side adjacent the stationary sealing bar 20. This eliminates the doubling of the pouch material adjacent the heating bar 22.

Means are provided at the discharge end of the accumulator conveyor 26 to receive any package or pouch P which has not been discharged to the sealing conveyor 16. Such means are shown as an open-top bin 42 disposed adjacent the end of the sealing machine conveyor 16. A guide blade 44 disposed adjacent the escapement blade 38 and curving downwardly over the bin directs the packages P to within the bin.

While the conveyor 26 has been shown as being top loaded on the upper section, the conveyor can also be loaded on the lower section. This would not flip the articles then if such is not required. Similarly, the conveyor can be loaded by hand.

While only a single embodiment has been disclosed, modifications can be made therein without departing from the inventive concept. Accordingly, it is desired to limit the invention only by the scope of the claims hereinafter following.

We claim:

1. For use with a sealing machine having an infeed conveyor that operates intermittently to bring open top plastic pouches thereon successively into a gas tight chamber whereat sealing means within the chamber seal the pouches when the infeed conveyor is terminated, the combination of an accumulator, comprising:
    (a) an endless conveyor disposed adjacent the infeed conveyor and having a portion thereof extending parallel to a portion of said infeed conveyor;
    (b) a plurality of open top trays formed in spaced adjacent relationship along the outward surface of the endless conveyor each adapted to receive and hold one of the pouches to be sealed;
    (c) a discharge mechanism located between the adjacent parallel portions of the infeed and endless conveyors and simultaneously spanning a specific number of said trays, and being movable transversely of the conveyors for simultaneously discharging the pouches within said specific trays to the infeed conveyor;
    (d) said infeed and endless conveyors being stopped concurrently and the discharge mechanism being adapted to discharge the pouches from the specific trays when the endless conveyor is stopped.

2. An accumulator according to claim 1, wherein the endless conveyor has upper and lower sides, and wherein the pouches are loaded onto the upper side and discharged from the lower side operable to flip each pouch over when depositing it to the infeed conveyor.

3. An accumulator according to claim 2, wherein the discharge mechanism includes a blade mechanism located below the lower side of the endless conveyor to support the pouches in the trays thereon, and wherein movement of the blade mechanism releases the pouches.

4. An accumulator according to claim 3, wherein a guide is disposed outwardly of the endless conveyor and extends between the upper and lower sides to support the pouches in the trays as the trays are transferred to the lower side.

5. An accumulator according to claim 4, wherein the endless conveyor is vertically aligned above the infeed conveyor.

6. An accumulator according to claim 4, wherein the upper side of the endless conveyor is tilted slightly related to the horizontal so that the open top of each pouch can be maintained higher than the rest of the pouch.

References Cited by the Examiner
UNITED STATES PATENTS

| | | | |
|---|---|---|---|
| 1,139,070 | 5/1915 | Phelps | 198—20 X |
| 1,264,843 | 4/1918 | Norton | 198—20 |
| 1,506,632 | 8/1924 | Gruetter | 198—20 |
| 2,764,274 | 9/1956 | Griswold et al. | 198—33 X |

EVON C. BLUNK, *Primary Examiner.*

M. L. AJEMAN, *Assistant Examiner.*